June 17, 1947.  A. F. TURNER ET AL  2,422,376

LIGHT BEAM DIVIDER

Filed Nov. 27, 1943

ARTHUR FRANCIS TURNER
ROBERT BRUCE HORSFALL JR.
INVENTORS

ATTORNEYS

Patented June 17, 1947

2,422,376

UNITED STATES PATENT OFFICE 2,422,376

LIGHT BEAM DIVIDER

Arthur Francis Turner, Brighton, and Robert Bruce Horsfall, Jr., Perinton, N. Y., assignors to Bausch & Lomb Optical Company, Rochester, N. Y., a corporation of New York Application November 27, 1943, Serial No. 512,010

2 Claims. (Cl. 88—1)

This invention relates to optical elements and more particularly to an element for dividing a beam of light.

Various types of elements have been heretofore proposed for dividing or splitting a light beam and the most commonly used elements comprise either a plate which carries a semi-transparent film of a metallic material or a pair of prisms having disposed intermediate to the adjacent faces thereof a similar film. These just described elements will divide a beam of light when the same are properly mounted in the path of the beam, but are objectionable in that in some instances as high as 40% of the light is lost by absorption in the film.

An element was also proposed which, although it obviated the absorption loss just mentioned, was not acceptable for other reasons. The element consisted of a pair of prisms so mounted that a very thin film of air separated a pair of faces thereof. This element was difficult to manufacture for mechanical spacers, having thicknesses less than a wave length of light, not only had to be produced, but also had to be positioned between the prism faces and held therebetween to space the faces of the element. The two prism faces had to be maintained parallel and, as they were in contact with air, soon became contaminated which necessitated the dismantling of the element for cleaning and the difficult reassembling of the same.

The element of the present invention is not subject to the defects of the previously proposed elements for it is relatively permanent and substantially no light is absorbed by the element. A beam, therefore, can be divided into components the sum of whose intensities is substantially equal to the intensity of the original beam. Thus the efficiency of an optical instrument embodying the element of the present invention is materially increased over similar instruments employing the previously proposed devices.

The element in its now preferred form comprises a pair of prisms joined by a suitable cement. A transparent non-metallic film having an index of refraction less than the index of the glass from which the prisms are formed is carried between the cemented surfaces of the prisms.

The element is so formed that the angle of incidence of the beam on the film is greater than the critical angle for the glass index-film index combination as calculated by Snell's law. Total reflection would then occur according to the laws of geometrical optics provided the film were several wave lengths in thickness. The thickness of the film, however, is held to a value which will not produce a total reflection but "frustrated" or "degenerate" total reflection.

The thickness of the film will depend on the indices of the film forming material and the glass of the prisms as well as on the angle of incidence of the beam on the film. The thickness of the film will control the amount of light transmitted, as well as the amount of light which is reflected. It will thus be understood that by altering the thickness of the film as well as the indices of the film forming material and the glass and by varying the angle of incidence on the film, it will be possible to vary the beam dividing action of the element.

Other features and advantages of the present invention will appear from the following description taken in connection with the accompanying drawing in which.

Figure 1:
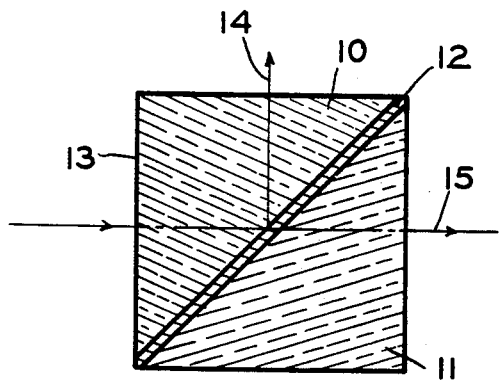
Fig. 1 is a enlarged diagrammatic view of an element of the prior art.
Figure 2:
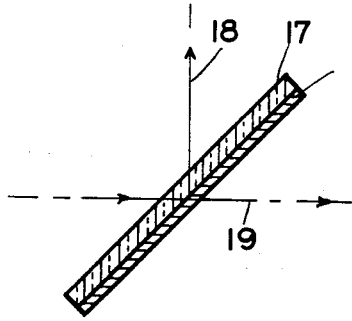
Fig. 2 is a view similar to Fig. 1 but showing another device of the prior art.

Fig. 1 and Fig. 2 of the drawing illustrate elements which are commonly used in various types of optical instruments for dividing or splitting a beam of light. The previously proposed element illustrated in Fig. 1 comprises a pair of right angle prisms 10 and 11, having their hypotenuse faces cemented together. A semi-transparent layer 12 of metallic material is formed at the interface of the prisms. The layer 12, as it is semi-transparent, will transmit as well as reflect light so that a ray incident on the face 13 of the prism 10 will be divided into ray components 14 and 15.

The intensities of the components 14 and 15 can be varied by changing the opacity of the metallic layer 12, but due to absorption of the light by this layer, a large part of the light is lost. For example, if the layer 12 is formed of metals such as platinum or palladium and the thickness of the layer is such that the element transmits approximately as much light as is reflected, the absorption loss amounts to substantially 50% of the light entering the element.

The efficiency of the element shown in Fig. 2 is somewhat greater, for there the layer 16 comprising platinum or palladium, in optical contact with the one surface of the plate 17 is exposed to air. The absorption loss in this case is approximately 40% if the layer transmits substantially as much light as is reflected, that is, if the component 18 is equal in intensity to the component 19.

It will be obvious that the optical efficiency of any instrument employing these previously proposed devices will be greatly reduced due to the light loss by absorption in the metallic layers 12 and 16. The element of the present invention obviates this difficulty which is had with the prior devices, for if the loss by absorption of the glass and cement is neglected, the element will divide a ray directed thereinto into components, the sum of whose intensities will equal the intensity of the original entering beam.

Figure 3:
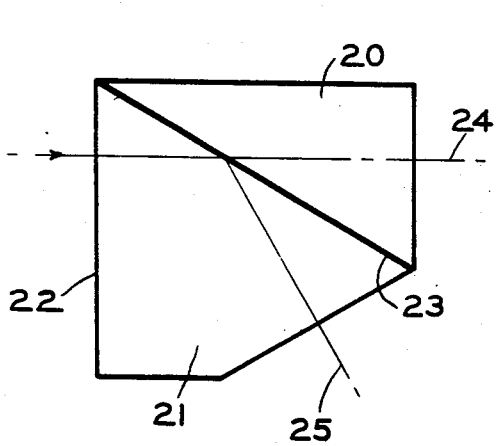
Fig. 3 is an enlarged diagrammatic view of the element of the present invention.

The element in the illustrated embodiment of the present invention, referring now to Fig. 3, comprises a right angle prism 20 having its hypotenuse face mounted to a face of the prism 21 which forms an angle of 60° with the face 22 of the same. The interface 23 carries a thin non-metallic film of transparent material. Although, as will be explained, the film may be formed of many different materials if the index of refraction thereof is less than that of the glass of the prism, in the form of the invention here illustrated and described the film is formed of cryolite. The cryolite can be deposited on the one face of one of the prisms by a high vacuum thermal evaporation process in a manner well known. Cryolite has a refractive index of 1.34, and the glass used to form the prisms 20 and 21 in the form of the invention here illustrated and described has an index of refraction of 1.617. After the cryolite has been deposited on the face of one of the prisms, the filmed face is then cemented to the face of the other prism with a cement having a refractive index substantially that of the glass of the prisms.

The element is intended to be mounted so that the face 22, which forms the entrance face of the element, is normal to the beam to be divided. It will thus be seen that in the element illustrated the angle of incidence of the beam on the film is 60°. It can be shown by Snell's law that this angle is greater than the critical angle for materials of 1.34 and 1.617 indices. Accordingly, if the thickness of the film were several times larger than the wave length of the light, total reflection would occur at the interface 23. The film is held at such a thickness, however, that total reflection does not occur, but that "frustrated" or "degenerate" total reflection is produced.

It has been determined that if the film of cryolite is deposited with an optical thickness of substantially ⅜ of a wave length of light measured at normal incidence, the element just described will divide the beam into components 24 and 25, the sum of whose intensities discounting loss by absorption in the glass and cement, will equal the intensity of the beam entering the element. With a film of the thickness noted the element will transmit approximately 50% of the beam and reflect approximately 50%. It should be understood now that, if the thickness of the film is increased, a smaller percentage of the light will be transmitted and a correspondingly larger percentage will be reflected. The reverse is equally true, for if the thickness of the film is decreased, a larger percentage of the light will be transmitted than is reflected. Thus, the percentages of the light to be transmitted or reflected can be easily varied by varying the thickness of the film.

The element, shown in Fig. 3, was specifically formed by depositing the film of cryolite by the usual high vacuum process on the hypotenuse face of the prism 20 which was formed of dense barium crown glass having an index of refraction of 1.617. The evaporation was stopped when the film appeared first order blue by reflected white light. Subsequent measure of the reflectance of the filmed surface on a recording spectrophotometer indicated that the optical film thickness was ¼ of a wave length at 650 millimicrons. The prism 20 was then cemented to the prism 21 with a cement having approximately the same index of refraction as the glass from which the prisms were formed.

The transmission and the reflectance of the element were determined visually for unpolarized mercury blue (435 millimicrons) and mercury yellow (578 millimicrons) light with the following results in which account has been taken of the reflectance losses at the entrance and exit faces of the prisms as well as the absorption loss in the glass but not of the absorption loss in the cement used:

|  | Blue | Yellow |
| --- | --- | --- |
|  | Per cent | Per cent |
| Reflectance | 44 | 30 |
| Transmittance | 47 | 68 |

It will be noted that for the blue light used the reflectance and transmittance of the element are substantially equal as the optical thickness of the film for light of a wave length of 435 millimicrons was substantially ⅜ of that wave length. For the yellow light the optical thickness was, of course, less and accordingly the transmittance increased at this wave length while the reflectance decreased. If the device were to be used for white light, the film thickness as heretofore mentioned would be chosen as ⅜ of a wave length of light from the intermediate portion of the visible spectrum.

It will also be noted that for blue light the sum of reflectance and transmittance is 91%, while for yellow light it is 98%. The difference between the two totals and 100% is due to the absorption in the cement used which was not absolutely colorless. The film of cryolite, unlike the metallic films of the prior elements, will not absorb any measureable portion of the light transmitted by the element of the present invention.

The transmission of the element of the present invention can be calculated from the following expressions assuming that the refractive index of prism 20 is the same as that of prism 21:

$$T_s = \frac{4 \cos^2 \phi \, (\sin^2 \phi - n^2)}{(1-n^2) \sinh^2 u + 4 \cos^2 \phi \, (\sin^2 \phi - n^2)}$$

$$T_p = \frac{4n^4 \cos^2 \phi \, (\sin^2 \phi - n^2)}{(1-n^2)^2 (\sin^2 \phi - n^2 \cos^2 \phi)^2 \sinh^2 u + 4n^4 \cos^2 \phi \, (\sin^2 \phi - n^2)}$$

where:

$T_s$ is the transmission of the s-component.
$T_p$ is the transmission of the p-component.
$\phi$ is the angle of incidence on the film measured in the glass prism.
$n$ is the ratio of the film index $n_f$ to the glass index $n_g$, i. e., $n = n_f/n_g$.
sinh $u$ is the hyperbolic sine of the function $u$.

$$u = \frac{2\pi d n_g}{\lambda} \sqrt{\sin^2 \phi - n^2}$$

$\lambda$ is the wave length in air of the light used.
$d$ is the geometrical thickness of the film.

The corresponding reflectances are given by:

$$T_s + R_s = 1$$

$$T_p + R_p = 1$$

Figure 4:
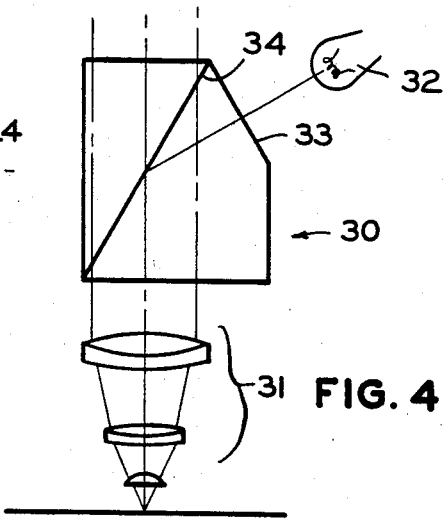
Fig. 4 is a diagrammatic illustration of a vertical illuminator embodying the element of the present invention.

There is shown in Fig. 4 a diagrammatical illustration of a part of a microscope, in which the element of the present invention is used. The element shown at 30 is employed to direct light to the subject to be examined, but yet permit the rays directed to the subject to pass upwardly through the same and into the eyepiece of the microscope. It will thus be understood that the full aperture of the objective system 31 can be used for viewing the subject undergoing examination.

In the illustrated form of the application of the element of present invention, light rays from a source such as the lamp 32 enter the element through the face 33 and, although a portion of the rays will be transmitted by the film 34, a portion will be deflected downwardly through the objective system 31 to the subject undergoing examination. In this application of the element of the present invention, the film should be of such a thickness as to deflect 50% of the light as well as to transmit 50% of the same. The light deflected downwardly will be reflected upwardly by the subject, and after passing through the objective system 31 will again enter the element 30. The light transmitted by the film 34 will pass to the eyepiece which has not been shown in the drawing.

In previously used devices such as shown in Fig. 4, the beam dividing element has usually consisted of an element similar to that shown in Fig. 2. Such an element, where the layer 16 reflects as much light as is transmitted, absorbs substantially 40% of the light incident thereon. It will be readily seen that if but 30% of the light directed to such an element was deflected downwardly to the subject and but 30% of the light re-entering the element was transmitted by the layer 16, only 30% of the light directed to the subject or but 9% of the entering light would be transmitted to the eyepiece. With the element of the present invention, as no light is absorbed by the film 34, approximately 50% of the light deflected downwardly, which as will be remembered amounts to 50% of the entering light, will be reflected by the subject upwardly through the objective system 31 and element 30. Thus a half of the light reflected to the subject or 25% of the entering light will be transmitted to the eyepiece. As substantially three times the amount of light will be transmitted to the eyepiece, it can readily be seen that a microscope using the element of the present invention will be far more efficient than the microscopes heretofore proposed in which elements such as shown in Fig. 2 have been used to divide the beam of light used to illuminate the subject.

Although cryolite has been specifically mentioned as the material from which the film of the element has been formed, the film can be formed from any non-metallic transparent substance which has an index less than the index of the glass from which the prisms are formed. The index of the film should be such that total reflection should occur but for the thickness of the film. If desired, magnesium fluoride could be used to form the film, and this material could be deposited by a high vacuum thermal evaporation process, or the film could be formed by chemically leaching the surface of the prisms which in this instance would be formed of a heavy lead glass having a relatively high refractive index.

It should, therefore, be understood that, while certain preferred embodiments of the present invention have been described herein, it is not limited thereby but is susceptible of changes in form and detail which are within the scope of the appended claims.

We claim:
1. A light beam divider for reflecting and transmitting portions of a light beam, said divider comprising a pair of prisms of refractive material, a light-transmitting film of solid material having low light absorbing properties interposed between and in optical contact with adjacent faces of the prisms, said film being positioned with respect to an entrance face of one prism so that light rays will be incident on the film at an angle greater than the critical angle for the prism-film interface, said film having a refractive index less than that of the prisms, said film having a thickness less than a wave length of light so that total reflection does not occur when light rays strike the film at an angle of incidence greater than the critical angle for the prism-film interface whereby the incident light rays will be partially reflected and partially transmitted, the relative quantities of reflected and transmitted light being dependent upon the thickness of the film.

2. A light beam divider comprising two glass prisms each having a refractive index of at least 1.6, one of said prisms having an entrance face, the other prism having an exit face which is substantially parallel to said entrance face, each of the prisms having an inclined face making an angle of about 60 degrees with the entrance and exit faces, a light transmitting film of cryolite having a refractive index of about 1.3 interposed between and in optical contact with the inclined faces of both prisms, the thickness of said film being less than that of a wave length of light so that light rays normally incident upon the entrance face will be partially transmitted and partially reflected by the film, the relative amounts of the transmitted and reflected light being controlled by the thickness of the film.

ARTHUR FRANCIS TURNER.
ROBERT BRUCE HORSFALL, Jr.

REFERENCES CITED

The following references are of record in the file of this patent:

UNITED STATES PATENTS

| Number | Name | Date |
|---|---|---|
| 1,661,611 | Hamburger et al. | Mar. 6, 1928 |
| 1,304,517 | Twyman et al. | May 20, 1919 |
| 2,182,142 | Ball et al. | Dec. 5, 1939 |
| 2,207,656 | Cartwright et al. | July 9, 1940 |
| 2,281,475 | Cartwright et al. | Apr. 28, 1942 |
| 2,074,106 | Foster | Mar. 16, 1937 |
| 2,303,906 | Benford et al. | Dec. 1, 1942 |
| 2,289,054 | Dimmick | July 7, 1942 |
| 2,352,777 | Douden | July 4, 1944 |
| 1,989,317 | Harper | Jan. 29, 1935 |
| 2,106,752 | Land | Feb. 1, 1938 |
| 2,189,298 | Rantsch | Feb. 6, 1940 |
| 2,281,474 | Cartwright et al. | Apr. 28, 1942 |
| 2,220,861 | Blodgett | Nov. 5, 1940 |
| 2,345,777 | Somers | Apr. 4, 1944 |
| 2,189,933 | Ball et al. | Feb. 13, 1940 |
| 2,281,280 | Gabor | Apr. 28, 1942 |
| 1,372,515 | Keller-Dorian | Mar. 22, 1921 |
| 1,460,706 | Comstock | July 3, 1923 |
| 1,989,317 | Harper | Jan. 29, 1935 |

FOREIGN PATENTS

| Number | Country | Date |
|---|---|---|
| 26,590 | France | Oct. 9, 1923 |
| 558,087 | France | May 16, 1923 |